US008838576B2

(12) United States Patent
Junqueira et al.

(10) Patent No.: US 8,838,576 B2
(45) Date of Patent: Sep. 16, 2014

(54) POSTING LIST INTERSECTION PARALLELISM IN QUERY PROCESSING

(75) Inventors: Flavio Junqueira, Barcelona (ES); Berkant Barla Cambazoglu, Barcelona (ES); Vassilis Plachouras, Chalandri (GR); Shirish Tatikonda, Columbus, OH (US)

(73) Assignee: Yahoo! Inc., Sunnyvale, CA (US)

( * ) Notice: Subject to any disclaimer, the term of this patent is extended or adjusted under 35 U.S.C. 154(b) by 375 days.

(21) Appl. No.: 12/577,534

(22) Filed: Oct. 12, 2009

(65) Prior Publication Data
US 2011/0087684 A1    Apr. 14, 2011

(51) Int. Cl.
*G06F 17/30* (2006.01)
*G06F 7/00* (2006.01)

(52) U.S. Cl.
CPC .............................. *G06F 17/30445* (2013.01)
USPC ............ 707/713; 707/718; 707/758; 707/764

(58) Field of Classification Search
USPC ........................................................ 707/764
See application file for complete search history.

(56) References Cited

U.S. PATENT DOCUMENTS

| 8,402,033 | B1* | 3/2013 | Mazumdar et al. ........... 707/748 |
| 8,560,550 | B2* | 10/2013 | Patterson ...................... 707/741 |
| 2004/0073549 | A1* | 4/2004 | Turkel et al. ...................... 707/5 |
| 2006/0036580 | A1* | 2/2006 | Stata et al. ......................... 707/3 |
| 2008/0027918 | A1* | 1/2008 | Altevogt et al. .................. 707/3 |
| 2008/0120314 | A1* | 5/2008 | Yang et al. ...................... 707/101 |
| 2009/0083214 | A1* | 3/2009 | Konig et al. ....................... 707/2 |
| 2009/0144232 | A1* | 6/2009 | Duffy et al. ........................ 707/3 |
| 2009/0228528 | A1* | 9/2009 | Ercegovac et al. ............ 707/203 |
| 2009/0254523 | A1* | 10/2009 | Lang et al. ......................... 707/3 |
| 2009/0319518 | A1* | 12/2009 | Koudas et al. ..................... 707/5 |
| 2010/0161584 | A1* | 6/2010 | Lindblad et al. .............. 707/706 |
| 2010/0161617 | A1* | 6/2010 | Cao et al. ....................... 707/741 |
| 2011/0022600 | A1* | 1/2011 | Sathe et al. ................... 707/742 |
| 2011/0040771 | A1* | 2/2011 | Gilyadov et al. ............. 707/754 |
| 2011/0131223 | A1* | 6/2011 | Patterson ...................... 707/758 |

OTHER PUBLICATIONS

Tsirogiannis, Dimitris. "Improving the Performance of List Intersection". Aug. 2009, pp. 838-849.*
Marin, Mauricio et al. "Scheduling Intersection Queries in Term Partitioned Inverted Files". 14th International Euro-Par Conference, Spain, Aug. 26-29, 2008.*
S.Tatakonda, F. Junqueira, B.Barla Cambazoglu, and V. Plachouras: Query on Efficient Posting List Intersection with Multicore Processors; Data Mining Research Lab, The Ohio State University, Columbus, Ohio.
M. Zukowski, S. Heman, N. Nes, and P. Boncz; Super-scalar ram-cpu cache compression. In Proceedings of the 22nd International Conference on Data Engineering (ICDE '06), 12 pages; Washington, D.C., USA Apr. 3-7, 2006, IEEE Computer Society.
E. Schurman and J. Brutlag; Performance Related changes and their user impact, Velocity 2009; 13 pages.

(Continued)

Primary Examiner — Alicia Lewis
(74) Attorney, Agent, or Firm — James J. DeCarlo; Greenberg Traurig, LLP (57) ABSTRACT

Disclosed herein is parallel processing of a query, which uses inter-query parallelism in posting list intersections. A plurality of tasks, e.g., posting list intersection tasks, are identified for processing in parallel by a plurality of processing units, e.g., a plurality of processing cores of a multi-core system.

27 Claims, 7 Drawing Sheets

(56) References Cited

OTHER PUBLICATIONS

R. Baeza-Yates, A. Gionis, F. Junqueira, V. Murdock, V. Plachouras, and F. Silvestri. The impact of caching on search engines. In Proceedings of the 30th annual international ACM SIGIR conference on Research and development in information retrieval, pp. 183-190, Jul. 23-27, 2007; Amsterdam NL.

J. Barbay, A. Lopez-Ortiz, and T. Lu. Faster Adaptive Set Intersections for Text Searching. Proceedings of 5th Workshop on Experimental Algorithms (WEA), 12 pages, 2006.

C. Bonacic, C. Garcia, M. Marin, M. Prieto, and F. Tirado. Improving Search Engines Performance on Multithreading Processors. In Proceedings of 8th International Meeting on High Performance Computing for Computational Science (VECPAR), 14 pages, Jun. 24-27, 2008; Toulouse, France.

S. Ding, J. He, H. Yan, and T. Suel. Using Graphics Processors for High-Performance IR Query Processing. Proceedings of 17th International World Wide Web Conference (WWW), 10 pages, Apr. 21-25, 2008; Beijing, China.

W. Pugh. Skip lists: a probabilistic alternative to balanced trees. Communications of the ACM, 33(6): 8 pages, Jun. 1990.

T. Strohman and W. Croft. Efficient document retrieval in main memory. In Proceedings of 30th SIGIR Conference on Research and Development in Information Retrieval, 8 pages, Jul. 23-27, 2007; Amsterdam NL.

M. Zukowski, S. Heman, N. Nes, and P. Boncz. Super-scalar ram-cpu cache compression. In Proceedings of the 22nd International Conference on Data Engineering (ICDE '06), 12 pages, Washington, DC, USA, Apr. 3-7, 2006. IEEE Computer Society.

Donald K. Burleson, Oracle9i RAC Tips; Types of Parallelism Inter-Query Parallelism; http://www.remote-dba.cc/teas_aegis_rac17.htm; 1996-2009; 2 pages.

Michael A. Olson; Wei Michael Hong; Michael Ubell; Michael Stonebraker; Query Processing in a Parallel Object-Relational Database System; Informix Software, Inc.; 1996; 8 pages.

Frachtenberg, Eitan; "Reducing Query Latencies in Web Search using Fine-Grained Parallelism"; Apr. 30, 2009; 15 pages; Microsoft—eitanf@microsoft.com.

* cited by examiner

POSTING LIST INTERSECTION PARALLELISM IN QUERY PROCESSING

FIELD OF THE DISCLOSURE

The present disclosure relates to information retrieval, and more particularly to parallel processing a query by a search engine and parallelism in posting list intersection.

BACKGROUND

Typically, an information retrieval application, e.g., a search engine, retrieves information, such as information contained in documents, in response to a query that contains one or more query, or search, terms. The search engine identifies documents, or other item containing information, scores the identified documents, and ranks the scored documents. The search engine can return the complete set of identified documents, or select some number of the top ranked documents, e.g., the documents considered to be most relevant based on their scores, in response to the query. A query contains one or more search terms, which are used as criteria for identifying the documents for retrieval. Before document scoring or ranking, a search engine typically selects documents that contain all of the query terms of a query.

Given the amount of information that is usually examined for a query, there is some degree of latency, or time delay, in responding to a query. It is desirable to minimize the query latency, or query response time, for a search engine.

SUMMARY

The present disclosure seeks to address failings in the art and to provide parallel processing of a query, and parallelism in posting list intersection. In accordance with one or more embodiments, a plurality of tasks, e.g., posting list intersection tasks, are identified for processing in parallel by a plurality of processing units, e.g., a plurality of processing cores of a multi-core system. In so doing, simultaneous improvements in throughput and query response time are achieved as compared to a single-processor system and/or non-parallel query processing.

In accordance with one or more embodiments, a method is provided. The method comprises receiving a query comprising a plurality of query terms, partitioning processing of the query into a plurality of posting list intersection tasks, each posting list intersection task to perform a partial intersection of at least two posting lists to identify a set of documents identified in a portion of each of the at least two posting lists processed by the posting list intersection task; performing, using a plurality of processing cores executing in parallel, the plurality of posting list intersection tasks; and identifying a result set of documents from the set of documents identified by each of the posting list intersection tasks as a response to the received query.

In accordance with one or more embodiments, a system is provided. The system comprises at least one server comprising a search engine that receives a query comprising a plurality of query terms. A partitioner coupled to the search engine partitions processing of the query into a plurality of posting list intersection tasks, each posting list intersection task to perform a partial intersection of at least two posting lists to identify a set of documents identified in a portion of each of the at least two posting lists processed by the posting list intersection task. The at least one server is coupled to a plurality of processing cores that execute in parallel to perform the plurality of posting list intersection tasks. The at least one server further comprises a result presenter that identifies a result set of documents from the set of documents identified by each of the posting list intersection tasks as a response to the received query.

In accordance with one or more embodiments, a computer-readable medium is provided. The computer-readable medium tangibly stores thereon computer-executable process steps. The process steps comprising receiving a query comprising a plurality of query terms; partitioning processing of the query into a plurality of posting list intersection tasks, each posting list intersection task to perform a partial intersection of at least two posting lists to identify a set of documents identified in a portion of each of the at least two posting lists processed by the posting list intersection task; performing, using a plurality of processing cores executing in parallel, the plurality of posting list intersection tasks; and identifying a result set of documents from the set of documents identified by each of the posting list intersection tasks as a response to the received query.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In general, the present disclosure includes a query parallelism system, method and architecture.

Certain embodiments of the present disclosure will now be discussed with reference to the aforementioned figures, wherein like reference numerals refer to like components.

Figure 1:
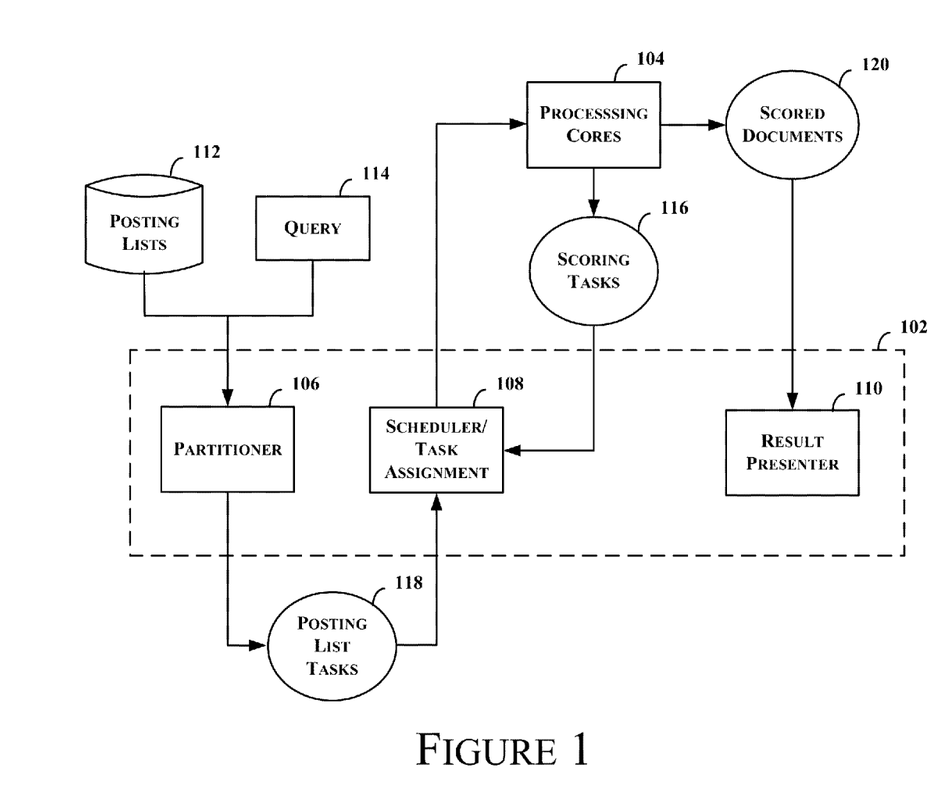
FIG. 1 provides an example of a component overview in accordance with one or more embodiments of the present disclosure.

The parallelism described in accordance with one or more embodiments can be used with information retrieval in which posting, or inverted, lists are used. By way of a non-limiting example, one information retrieval application that uses posting lists is a search engine. FIG. 1 provides an example of a component overview of a search engine implementing posting list parallelism in accordance with one or more embodiments of the present disclosure.

Search engine 102, includes without limitation, a partitioner, or query processing partitioning component, 106, scheduler 108 and result presenter 110. It should be apparent that search engine 102 can include additional components. Additionally, it is possible that one or both of partitioner 106 and scheduler 108 are external to search engine 102. In accordance with one or more embodiments, partitioner 106 identifies tasks, which are pushed onto a posting list task pool, or queue, 118. Scheduler 108 assigns each posting list task from pool 118 to one of the processing cores, or processing units, 104. In accordance with one or more embodiments, processing cores 104 can be two or more independent cores of a processing system. By way of some non-limiting examples, the cores can be integrated onto a single integrated circuit die, or a chip multiprocessor (CMP), or the processors can be integrated onto multiple dies in a single chip package. By way of a further non-limiting example, cores in a multi-core system typically share on-chip level 2 cache as well as the front-side bus to main memory. As these systems become more popular, the general trend has been from single-core to many-core: from dual-, quad-, eight-core chips to the ones with tens of cores. Examples of chip processors that provide multi-core processing systems include Intel and Advanced Micro Devices (AMD). It should be apparent that embodiments of the present disclosure can be used with any multiple-processor, or processing unit, arrangement.

A processing core 104 processes an assigned posting list task, and generates a set of documents. As is discussed in more detail below, each processing core 104 processes at least two posting lists to identify documents from the posting lists. By way of a non-limiting example, each posting list is associated with a term of query 114, and the processing core 104 processes two or more posting lists to identify an intersection of the posting lists to identify a set of documents containing the terms of query 114 represented by the posting lists being processed by processing core 404. Scoring tasks 116 comprises tasks associated with the set of documents identified by the processing cores 104 processing assigned posting list tasks 118. The set of documents comprise the documents that contain the terms of query 114. Scoring tasks 116 comprises a set of scoring tasks, each task corresponding to at least one of the documents in the set of documents identified by the processing cores 104 processing the assigned posting list tasks. In accordance with one or more embodiments, scheduler 108 schedules the scoring tasks to the processing cores 104.

In accordance with one or more embodiments, scheduler 108 assigns a task, a posting list task 118 or scoring task, to an idle processing core 104. By way of a non-limiting example, scheduler 108 receives status information for each processing core 104 and evaluates the status information to determine the processing state of each processing core 104. In a case that the status information indicates that a processing core 104 is available to process a task, scheduler 108 selects a task and assigns the task to the processing core 104. In accordance with one or more embodiments, scheduler 108 can monitor pools 116 and 118 to make a determination from which pool it pulls a task. By way of a non-limiting example, in a case that the number of scoring tasks is less than a minimum threshold, scheduler 108 can select a task from posting list task pool 118, in order to replenish the scoring task pool 116. By way of another non-limiting example, in a case that the number of scoring tasks (or posting list tasks) exceeds a maximum threshold, scheduler 108 can select tasks from the scoring task pool 116 (or posting list task pool 118). It should be apparent that any type of scheduling technique can be employed by scheduler 108 to manage pools 116 and 118.

In the example of FIG. 1, a processing core 104 executes either a posting list task or a scoring task. The posting list task identifies a set of documents, and a scoring task scores a document, e.g., identifies a score that identifies a degree of relevance of the document to query 114. It should be apparent that any technique now known or later developed can be used to score a document relative to query 114. In accordance with at least one alternate embodiment, each processing core 104 assigned a posting list task 118 performs the posting list task that identifies a set of documents, and then scores the identified documents as a part of the posting list task. In this alternative case, scheduler 108 schedules the posting list tasks 118, but does not need to schedule scoring tasks 116, and there is no need to create scoring task pool 116. In any case, processing cores 104 generate a set of scored documents 120, which are forwarded to a result presenter 110. In accordance with one or more embodiments, result presenter 110 can order and/or cull the scored documents 120 based on their scores, and output a set of search results, which identify documents considered relevant to query 114.

In accordance with one or more embodiments, partitioner 106 and/or scheduler 108 is decentralized, as an alternative or supplement to the centralized approach shown in FIG. 1. In accordance with at least one of the alternative embodiments, partitioner 108 and/or scheduler 108 can be decentralized such that multiple ones of processing cores 104 perform the functionality.

Figure 2:
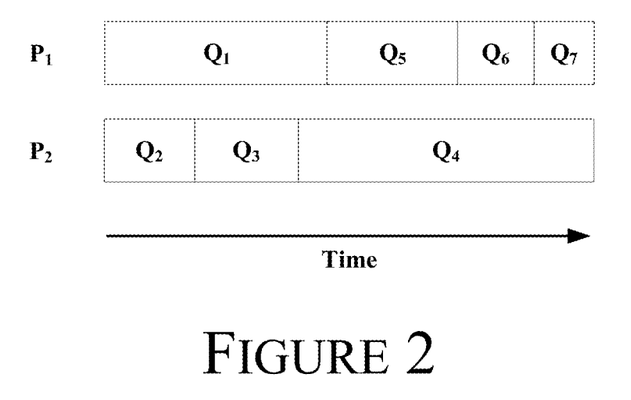
FIG. 2 provides an example of inter-query processing in accordance with one or more embodiments of the present disclosure.

In accordance with one or more embodiments, processing cores 104 can be used for inter-query and intra-query parallelism. Inter-query parallelism involves parallelism between the queries. Inter-query parallelism uses multiple processing units, each one processing a query, so that multiple queries can be processed in parallel. In this approach, a query is processed by one processing unit, and the number of queries capable of being processed in parallel is a function of the number of processing units. Inter-query parallelism exploits parallelism among queries by handling each query on a different core 104. Using inter-query parallelism, posting lists for a given query are intersected using a merge-based technique with appropriate pruning strategies based on skips. Compressed portions of a posting, e.g., the documents within a skip pointer are decompressed on demand. FIG. 2 provides an example of inter-query parallelism. With reference to FIG. 2, $P_1$ and $P_2$ are instances of a processing core, or processor, of processing core 104. Referring to FIG. 2, with inter-query processing, a query is processed by one processing core 104, such that posting lists 112 associated with terms of query 114 would be processed in their entirety by the processing core 104 processing query 114. In the example, processing core $P_1$ processes queries $Q_1$, $Q_5$, $Q_6$ and $Q_7$, and processing core $P_2$ processes queries $Q_2$, $Q_3$ and $Q_4$.

Figure 3:
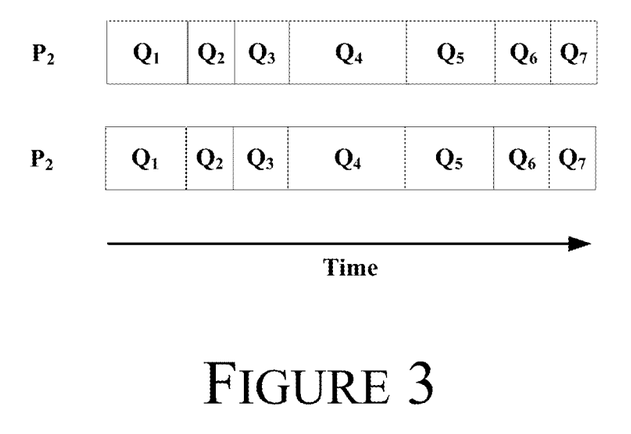
FIG. 3 provides an example of intra-query processing in accordance with one or more embodiments of the present disclosure.

Intra-query parallelism involves parallelism within a given query. Intra-query parallelism exploits the parallelism within a query by dividing the associated work into independent tasks. In accordance with one or more embodiments, each task processes a portion of the posting lists 112 associated with the terms of query 114, and performs a portion of the posting list intersection that is to be performed for query 114 using processing cores 104. FIG. 3 provides an example of intra-query parallelism involving two of processing cores 104. In the example of FIG. 3, each of queries $Q_1$-$Q_7$ are processed by processing cores $P_1$ and $P_2$. In contrast to inter-query processing, with intra-query processing, a query can be processed by more than one processing core 104. By way of some non-limiting examples, partitioner 106 partitions query 114 into multiple posting list intersection tasks 118, which are independent and can be processed by any of processing cores 104.

In accordance with one or more embodiments, the posting lists 114 are used to achieve efficiencies in query parallelism, and minimize query latency. Work is partitioned across processing cores 104 to balance load more evenly, e.g., to reduce idle time per core. Memory accesses of individual cores are minimized so that the memory bandwidth is not saturated. Simultaneous improvements in both throughput and query response time can thereby be achieved.

In accordance with one or more embodiments, posting lists 112 are used to identify the documents that satisfy a query. Each posting, or inverted, list 114 is associated with a term, e.g., one of the terms of query 114. A posting list 112 for a term is a sorted list of identifiers of documents that contain the term. Each entry in a posting list 112 comprises a document identifier of the document, and can optionally include a number of occurrences of the term in the document and/or the location of the occurrences of the term in the document. Posting lists 112 are usually kept in compressed format, e.g., to reduce the storage requirements. The compressed format makes it difficult, if not impossible, to support random accesses to at least the compressed portion of a list.

A posting list for a term can be stored as a skip list. A skip is a pointer $d_1 \rightarrow d_2$ between two non-consecutive documents $d_1$ and $d_2$ in the posting list. The number of documents skipped between $d_1$ and $d_2$ is defined as the skip size, or the size of the skip. The posting list for a given term t, L(t), is a tuple $(S_t, C_t)$ where $S_t = \{s_1, s_2, \ldots, s_k\}$ is a sequence of skips and $C_t$ contains the remaining documents (between skips) stored in compressed form. The functionality described herein is independent of the choice of a specific compression scheme. Any compression scheme can be selected, e.g., PForDelta. Skips are used to accelerate list intersection. In accordance with at least one embodiment, skips are further leveraged to provide random access over compressed posting lists.

Figure 4:
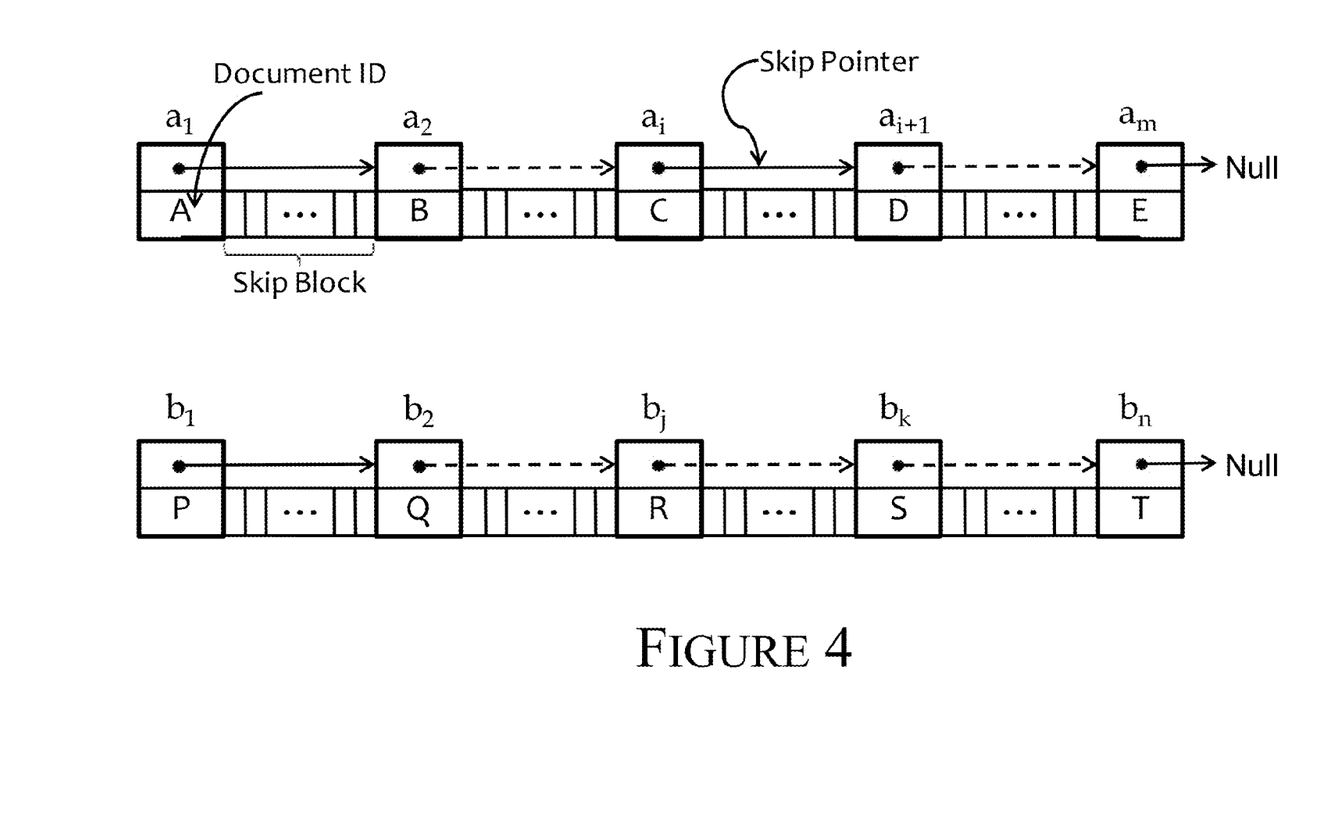
FIG. 4 provides examples of posting lists represented as skip lists in accordance with one or more embodiments.

By way of a non-limiting example, consider a query q with two terms a, with a posting list $L(a)=(S_a, C_a)$, and b, with a posting list $L(b)=(S_b, C_b)$. FIG. 4 provides examples of posting lists represented as skip lists for terms a and b of query q. Note that $S_a$ and $C_a$ (similarly, $S_b$ and $C_b$) are shown in an interleaved manner for purposes of illustration and greater understanding. The posting list size, m, in $S_a$, can be expressed as $m=|S_a|$, and the posting list size, n, in $S_b$ can be expressed as $n=|S_b|$. A posting list can be organized into blocks, with a fixed number of postings per block, which can be referred to as the block size, e.g., 128, 256, 512 postings per skip block. In accordance with one or more embodiments, in a case that a posting list size is measured by the number of postings, e.g., a posting corresponding to a document containing the term, the size of a posting list is the number of postings. In accordance with one or more embodiments, a posting list size can be a function of the number of skips in the posting list, which can be a function of the number of documents in which the term appears, and the block size of each skip, e.g., the number of postings in a block. In accordance with at least one embodiment, the skip, or block, size has the same value, e.g., a universal, or uniform, value, in a posting list and/or across posting lists. Alternatively, a non-uniform skip size can be used within a posting list and/or across posting lists.

In accordance with one or more embodiments, for a given skip in L(a), $a_i$ a posting list intersection task is created to operate on a portion of posting lists L(a) and L(b) identified by skip pointer $a_i$ and $a_{i+1}$ of posting list L(a) and skip pointers $b_j$ and $b_k$ of posting list L(b). In accordance with one or more such embodiments, for a given skip, $a_i$, and the next consecutive skip, $a_{i+1}$, in L(a), skips $b_j$ and $b_k$ from L(b) are chosen such that $a_i \geq b_j$ and $a_{i-1} \leq b_k$. In other words, all the documents within a skip pointer $a_i \rightarrow a_{i+1}$ fall in the document interval given by $[b_j, b_k]$. In other words, the skip interval defined by $b_j$ and $b_k$ is at least as large as the skip interval defined by $a_i$ and $a_{i+1}$. A list intersection method is then used to find common elements from these skips lists. It should be apparent that this approach can be extended for additional query terms. In accordance with one or more embodiments, a set of independent tasks $\{t_1, t_2, \ldots, t_m\}$ can be generated, e.g., by partitioner 106, where $t_i = (a_i, a_{i-1}, b_j, b_k)$, $a_i$ and $a_{i+1} \in S_a$ for $1 \leq i \leq m$ and $b_j$ and $b_k \in S_b$ for $1 \leq j \leq k \leq n$. In accordance with one or more embodiments, i, i+1, j and k correspond to document identifiers. In accordance with this exemplary definition, $a_{i+1}$ is undefined when i=m.

FIG. 4 provides examples of posting lists represented as skip lists L(a) and L(b) for terms a and b of query q. The posting list size, m, in $S_a$, can be expressed as $m=|S_a|$, and the posting list size, n, in $S_b$ can be expressed as $n=|S_b|$. Assume, without loss of generality, that the query terms are sorted in increasing order of their posting list size, i.e., $m \leq n$. In accordance with one or more embodiments, for each skip pointer in L(a), a task is created with one or more skip pointers from L(b), and intersection is performed on resulting sequences of posting lists. Skips $a_i$, $a_{i+1}$, $b_j$ and $b_k$ selected using the above definition ensure that the documents that contain at least one occurrence of query term a, as identified by pointers within the skip interval $C \rightarrow D$ fall within the skip interval given by skip pointers R and S, which includes pointers to documents that contain at least one occurrence of query term b.

In accordance with one or more embodiments, a posting list intersection task comprises performing a merge-based or search-based list intersection algorithm on skips from $S_a$ and $S_b$. In the example shown in FIG. 4, a solid line with an arrow denotes a direct link between two consecutive skips, e.g., $a_i$ and $a_{i+1}$ in L(a), and a dotted line with an arrow denotes that there may be multiple skips between the skips connected by the arrow, e.g., $b_j$ and $b_k$ in L(b). Using the example of FIG. 4 as one non-limiting example, the posting list intersection task for L(a) and L(b) identifies, for each document identified in the skip interval $a_i \rightarrow a_{i+1}$ in list L(a) whether the document is identified in the skip interval(s) $b_j \rightarrow b_k$ in list L(b). If so, the identified common document is added to the set of documents that contain query terms a and b. In any case, the task continues with any pointers in L(a) remaining until all of the pointers in the portion of the L(a) assigned to the task are examined against the pointers in the portion of L(b) assigned to the task.

The following provides a non-limiting example of pseudocode for use in partitioning posting lists for parallelized posting list intersection in accordance with one or more embodiments. In the example, L(a) and L(b) are two lists which are to be intersected, and they are represented using skip lists. It should be apparent that even though the example involves two posting lists (i.e., two query terms), the underlying functionality is not limited to two lists. The number of skips in these two lists is m and n, respectively, i.e., $|L(a)|=m$ and $|L(b)|=n$. The two lists L(a) and L(b) can thus be denoted by a list of skip pointers $(a_1, a_2, \ldots, a_m)$ and $(b_1, b_2, \ldots, b_n)$, respectively. Briefly, for each skip block of L(a), a sequence of skip blocks is determined from L(b) to define or create a task. In accordance with one or more embodiments, defined tasks are pushed on to a task pool, and the tasks in the pool are processed by the processors (or cores) in parallel. For expository purposes, let docid[L,s] be the document ID that is present at the skip block s in list L. For example in FIG. 4, docid[L(a), $a_i$]=C and docid[L(b), $b_j$]=R.

```
for i = 1 ... m−1
do
      doc1 = docid[L(a), a_i]
      doc2 = docid[L(a), a_{i+1}]
      find b_j and b_k from L(b) such that
             1 ≤ i < m and 1 ≤ j < k ≤ |L(b)| and
             doc1 ≥ docid[L(b), b_j] and doc2 ≤ docid[L(b), b_k]
      create task t = (a_i, a_{i+1}, b_j, b_k)
      push t onto task pool TP
end for
// process this for loop in parallel, among P processors (or cores), for the
      tasks in the task pool, TP
parallel: for each t = (a_i, a_{i+1}, b_j, b_k) in TP
do
      decompress required skip blocks from L(a) and L(b) based on t
      intersect the decompressed portions of the two lists
end for
```

Note that $b_j$ and $b_k$ in a task need not be consecutive skips in list L(b). For the example lists shown in FIG. 4, a task ($a_i$, $a_{i+1}$, $b_j$, $b_k$) is created if C≥R and D≤S. Note that, C=docid[L(a), $a_i$] and D=docid[L(a), $a_{i+1}$]. Similarly, R=docid[L(b), $b_j$] and S=docid[L(b), $b_k$]. It is also assumed, without loss of generality, that the query terms, e.g., a and b in the example, are sorted in increasing order of their posting list size, i.e., m≤n.

In accordance with one or more embodiments, each task fully specifies the portion of posting lists that is to be intersected by a processing core 104 performing the task. In other words, processing of a task does not depend on other tasks. Therefore, the tasks can be processed independently from each other. Once the tasks are created and pushed into a task pool, different cores 104 pick up the tasks one by one from the pool and process them. Advantageously, by partitioning work into independent tasks, it is possible to realize efficient parallel performance, since it reduces the need for synchronization among different processing cores.

In accordance with one or more embodiments, processing of each task involves decompression of specified portions of posting lists, which is followed by the intersection of decompressed portions. Common documents found from the intersection can then be fed to a scoring phase for further processing. The scoring phase can involve operations such as scoring, ranking, culling, presentation, and the like. Since document scores are independent of each other, the scoring phase can be parallelized in a trivial manner. The common documents resulted from the intersection phase can be pushed into a scoring pool. Each core can then take a document from the scoring pool, score it to determine its relevance to the given query 114, and then proceed to the next document from the scoring pool 116. The relevance scores of each document can be stored in a priority heap so that top-K relevant documents can be obtained at the end of scoring phase. In accordance with one or more embodiments, efficiencies can be achieved by integrating the posting list intersection and scoring tasks.

Although functionality of the above pseudocode is described relative to two query terms, it should be apparent that has applicability to queries with more than two query terms. By way of a non-limiting example, in a case that a query has k terms, where k is greater than 2, each task created from work partitioning contains 2*k skip indices, where each term (i.e., posting list) contributes two skip indices. It the discussion below, it is also assumed that the k query terms are sorted in increasing order of their posting list size. The first two indices of the 2*k skip indices in a task are determined in the manner discussed above in connection with the pseudocode using the smallest skip list, and the next two indices refers to two skips (need not be consecutive) from the second smallest list, such that L(a) corresponds to the smallest skip list and L(b) corresponds to the next smallest skip list. For a given consecutive skips from the smallest posting list, the remaining 2*(k−1) indices are found in a similar manner in which $b_j$ and $b_k$ are determined in the pseudocode shown above. In other words, for a given two consecutive skips from the smallest list (e.g., $a_i$ and $a_{i−1}$), as L(a), the procedure described above can be directly applied to determine the portions of the remaining posting lists, each as L(b), that are relevant for intersection. Once the tasks with skips from all posting lists are generated and pushed onto the task pool, all processing cores can process the tasks in a similar manner to that described above.

Figure 5:
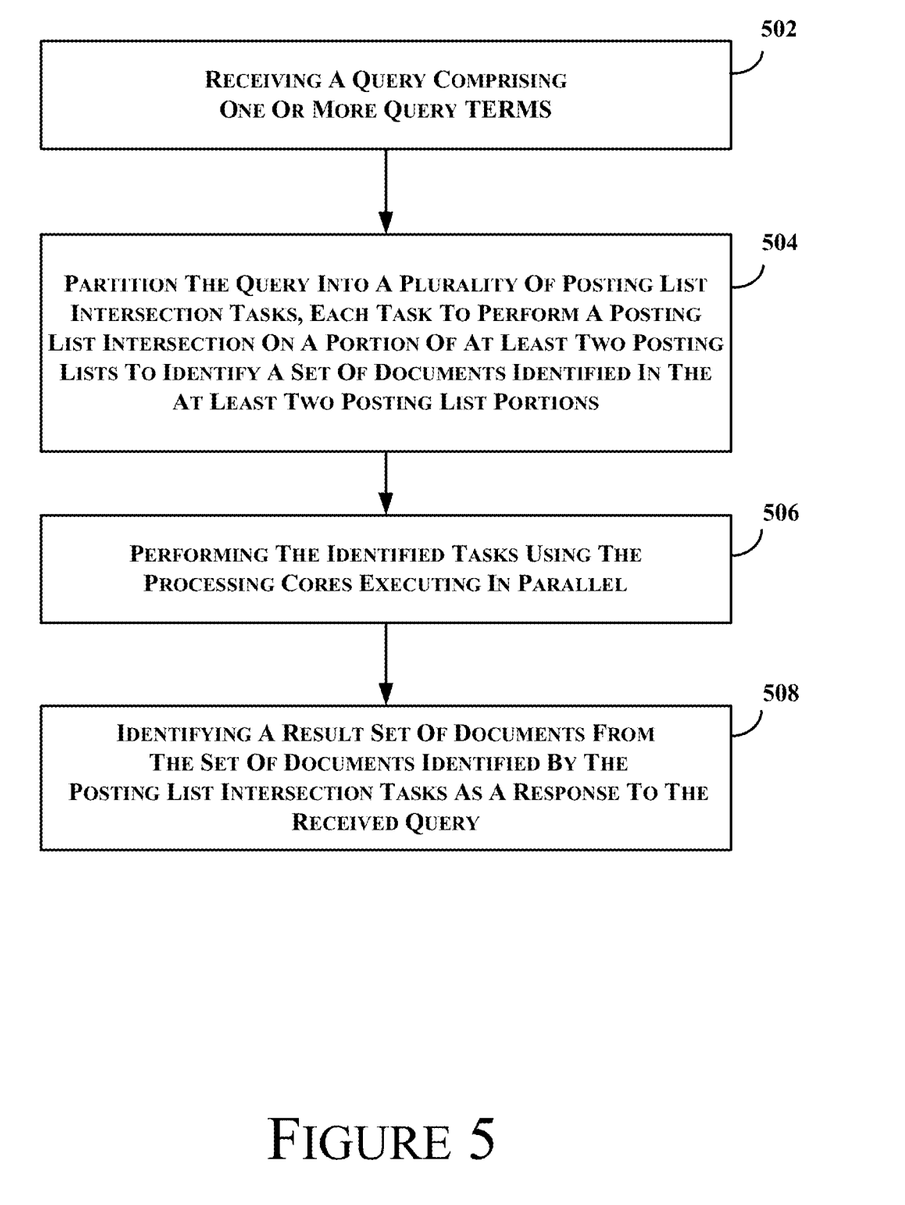
FIG. 5 provides a query processing process flow in accordance with one or more embodiments.

FIG. 5 provides a query processing process flow in accordance with one or more embodiments. In accordance with one or more embodiments, the process flow can be performed by search engine 102, or other component, which includes partitioner 106 and scheduler 108.

In accordance with the one or more embodiments, the query processing is accomplished using intra-query parallelism. In accordance with at least one embodiment, a query is received, at step 502. The received query comprises a plurality of query terms, e.g., query terms a and b. At step 504, the query, or the processing of the query, is partitioned. By way of a non-limiting example, a plurality of posting list intersection tasks are identified by partitioner 106. As discussed herein, each posting list is associated with one of the query terms, and each posting list intersection task identified by partitioner 106 performs a partial intersection of at least two posting lists to identify a set of documents identified in a portion of each of the at least two posting lists. In accordance with one or more embodiments, a processing core 104 that executes a posting list intersection tasks that contain all of the query terms corresponding to the posting lists being processed by the processing core, e.g., performs a boolean AND operation. By way of a non-limiting example, the postings lists of all query terms are read from the disk, and the lists are scanned in the execution of the plurality of posting list intersection tasks to identify the documents that appear in all lists.

Typically, within a posting list, postings are sorted by increasing document ID, or identifier, and lists are compressed for space efficiency. Also, at certain points (usually at regular intervals) in the lists, skip pointers are inserted to skip portions of postings, i.e., to provide random access functionality to posting lists. In accordance with one or more embodiments, the parallelism within a query is achieved by dividing the associated list intersection work into multiple, independent tasks. For a query with two terms, a task corresponds to intersecting a subset of the posting list for the first query term with a subset of postings that belong to the posting list of the second query term. This approach is extendable to a query with more than two terms. By way of some non-limiting examples, a posting list intersection can be performed over more than two posting lists, e.g., a skip interval in L(a) is contained within a skip interval of L(b), which is contained within a skip interval, of L(c), etc. Alternatively, a posting list intersection can be performed between the posting list having the smallest posting list size, e.g., L(a), and each of the posting lists, L(b), L(c) and L(d), of the other terms of the query, to identify a set of documents from each intersection of two documents, and a set of common documents over all of the posting list intersections can be identified.

Figure 6:
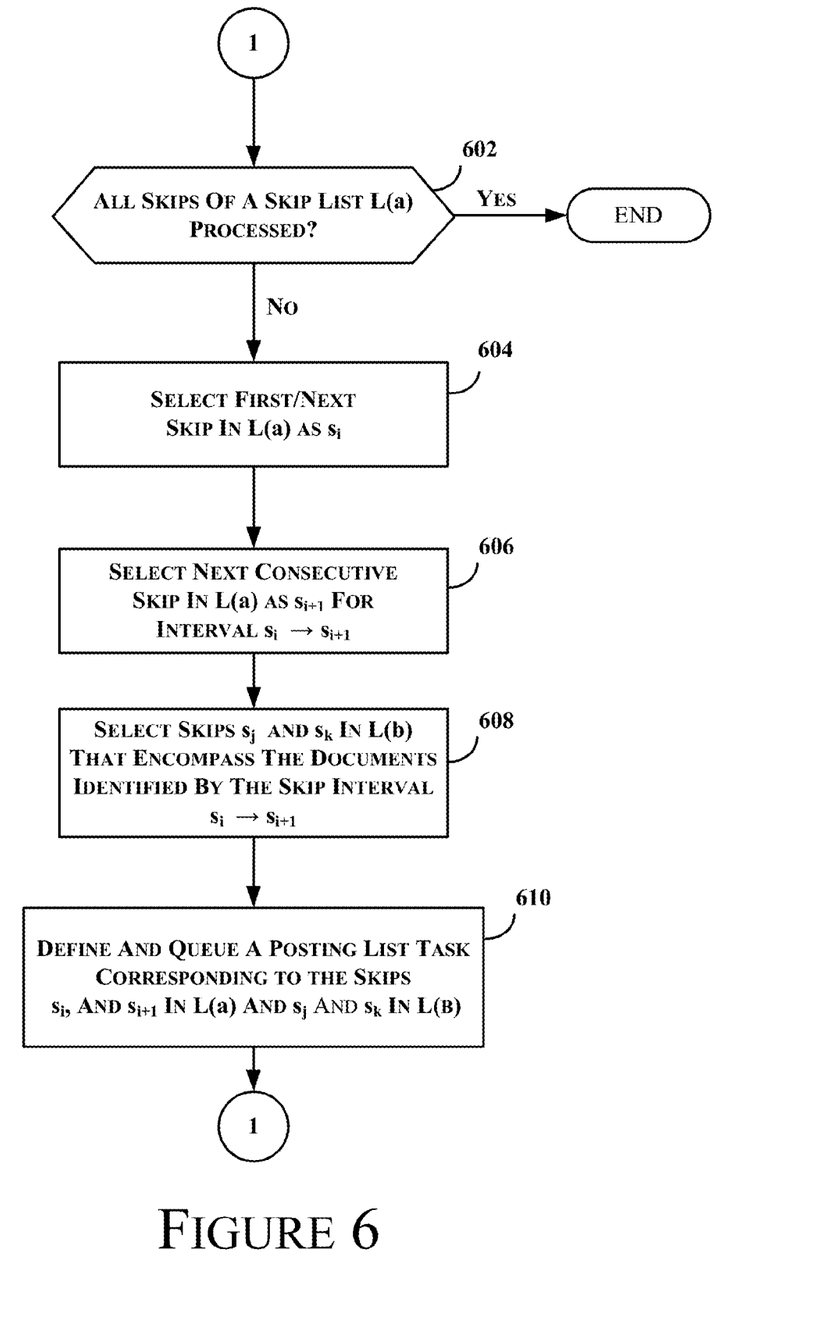
FIG. 6 provides a task generation process flow in accordance with one or more embodiments of the present disclosure.

FIG. 6 provides a task generation process flow in accordance with one or more embodiments of the present disclosure. The task generation process is performed at step 504 by partitioner 106, for example. In the example of FIG. 6, a posting list intersection is being performed using two skip lists, L(a) and L(b), and of the two L(a) has the smaller of the two skip list sizes. At step 602, a determination is made whether all of the skips in skip list L(a) have been processed. If so, processing ends, with the combination of the set of documents from each task performed in the posting list intersection of the two lists identifying the documents that contain term a and term b of a query.

If not, processing continues to step 604 to select the next, or first, skip in skip list L(a) as $a_i$. At step 606, the next consecutive skip, $a_{i+1}$, in skip list L(a) is selected. At step 608, a skip interval, which is identified by two skips $b_j$ and $b_k$, in skip list L(b) are identified. In accordance with one or more embodiments, the document interval identified in skip list L(b) encompasses the skip interval in skip list L(a), so that all of the documents identified by the skip interval $a_i \rightarrow a_{i+1}$ in L(a) are encompassed in, or fall within, the document interval given by $[b_j, b_k]$ in L(b). Expressed in somewhat more formal terms, the skip interval defined by skip $a_i$ and skip $a_{i+1}$ in $S_a$ for $1 \leq i \leq m$, where $m=|S_a|$, and the document interval defined by skip $b_j$ and skip $b_k$ in $S_b$ for $1 \leq j \leq k \leq n$, where $n=|S_b|$ is such that $a_i \geq b_j$ and $a_{i+1} \leq b_k$. At step 610, a posting list intersection task is defined and placed on the queue, posting listing task pool 118. Processing continues at step 602 to process any remaining skips in skip list L(a).

Referring again to FIG. 5, step 506, each of the posting list intersection tasks is assigned to one of processing cores 104, e.g., by scheduler 108. In accordance with one or more embodiments, the plurality of posting list intersection tasks are executed by the processing cores 104 executing in parallel. At step 508, a result set of documents are identified, as a response to the received query, using the set of documents identified by each of the posting list intersection tasks. Step 508, which is performed by result presenter 110, can perform ranking and/or culling using document scores generated by the processing cores 404 executing scoring tasks 116.

Embodiments described herein, intra-query parallelism to achieve efficiency gains that lead to both throughput and response latency improvements in query processing. Experiments conducted on the intra-query parallelism provided in accordance with one or more embodiments of the present disclosure show significant reduction in query latency over inter-query parallelism. Assuming that Q is a given query workload, the following are non-limiting examples of measurements that can be considered to measure performance: (i) Speedup, or acceleration, which is defined as $T_1/T_P$, where $T_1$ is the time to process the query workload with one processor and $T_P$ is the time using P processors; (ii) throughput, which is measured as the ratio between total number of queries |Q| and the total time spent in processing them; (iii) average query latency that is computed as $\Sigma_{i=1}^{|Q|} f_i - s_i /|Q|$, where $s_i$ is the time at which the intersection process for the $i^{th}$ query is started, and $f_i$ is the time at which the process is complete. By way of a non-limiting example, test data used consists of a crawl of documents from a domain, such as the UK domain, and a query log, such as an Altavista query log with 200,000 queries, |Q|=200,000, the queries are processed in a streaming fashion, and the skip size of skip lists is set to 512. It should be apparent that any domain and/or query log can be used.

With respect to acceleration and throughput, an inter-query model achieves virtually linear scalability, e.g., increase in throughput is a linear function of the number of cores, due to very simple parallelization. Intra-query model incurs some runtime overhead due to task creation and task pool maintenance, which results in a somewhat sub-linear relationship between throughput and number of cores. The average query latency of inter-query parallelism is almost constant since only the parallelism between different queries is explored. In contrast, average query latency reduces continuously for intra-query parallelism as the number of cores is increased. It is important to note that the drop in throughput and speedup due to the intra-query model when compared to that of the inter-query model is less than 20%. However, the improvement in query latency is more than five-fold. In summary, inter-query parallelism only improves the query throughput and speedup whereas intra-query parallelism provides excellent improvement in query latency, while sacrificing some minimal performance with respect to throughput and speedup. Additionally, the intra-query parallelism approach used in accordance with embodiments of the present disclosure yields memory accesses that are small and uniform. Thus, it is highly unlikely that the memory bandwidth reaches its saturation.

In accordance with one or more embodiments, search engine 102 can implement a hybrid parallelism, which includes both intra-query and inter-query parallelism processing modes. Some queries can be processed using an inter-query parallelism mode and other queries can be processed using the intra-query parallelism mode. A determination of which mode to use for a query can be based on such criteria as the size of the query, the size of the posting lists, etc. By way of a non-limiting example, the determination can be based on the complexity of the query; if the query is considered to be complex, e.g., based on the number of query terms, size of the posting lists, etc., the query can be processed using intra-query parallelism; if the query is determined to not be complex, the query can be processed using inter-query parallelism mode.

Figure 7:
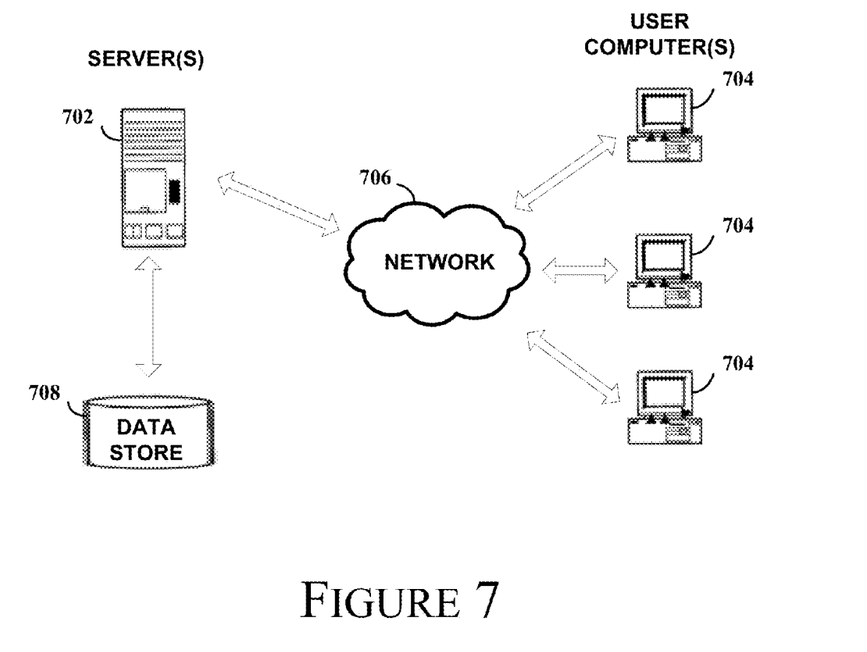
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, 702 are configured to comprise functionality described herein. For example, a computing device 702 can be configured as search engine 102, partitioner 106 and/or task scheduler 108, to provide functionality to process a query using intra-query parallelism as described in accordance with one or more embodiments disclosed herein. The same or another computing device 702 can be configured to include functionality of a crawler to identify documents indexed by posting lists 112. One or more instances of data store 708 can be used to store posting lists 112, scoring task pool 116 and/or posting list task pool 118. Data store 708 can be any computer readable medium, or media. Data store 708 can be used to store program code, e.g., executable code, to configure one or more computing devices, e.g., one or more of server 702, to provide functionality described in connection with one or more embodiments of the present disclosure.

Computing device 702 can serve content to user computers 704 using a browser application via a network 706. The user computer 704 and server 702 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computer 704 can include one or more processors, memory, a removable media reader, network interface, display and interface, and one or more input devices, e.g., keyboard, keypad, mouse, etc. and input device interface, for example. In accordance with one or more embodiments, one or more computing devices, each comprising multiple processing units, is/are used to process posting list intersection tasks in accordance with at least one embodiment. One skilled in the art will recognize that server 702 and user computer 704 may be configured in many different ways, and implemented using many different combinations of hardware, software, or firmware.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP). In accordance with one or more embodiments, a computing device 702 can make a user interface available to a user computer 704 via the network 706. The user interface made available to the user computer 704 can include content items, or identifiers (e.g., URLs) selected for the user, e.g., as a result set in response to a query from the user computer 704, in accordance with one or more embodiments of the present invention. In accordance with one or more embodiments, computing device 702 makes a user interface available to a user computer 704 by communicating a definition of the user interface to the user computer 704 via the network 706. The user interface definition can be specified using any of a number of languages, including without limitation a markup language such as Hypertext Markup Language, scripts, applets and the like. The user interface definition can be processed by an application executing on the user computer 704, such as a browser application, to output the user interface on a display coupled, e.g., a display directly or indirectly connected, to the user computer 704.

It should be apparent that embodiments of the present disclosure can be implemented in a client-server environment such as that shown in FIG. 7. Alternatively, embodiments of the present disclosure can be implemented other environments, e.g., a peer-to-peer environment as one non-limiting example.

Figure 8:
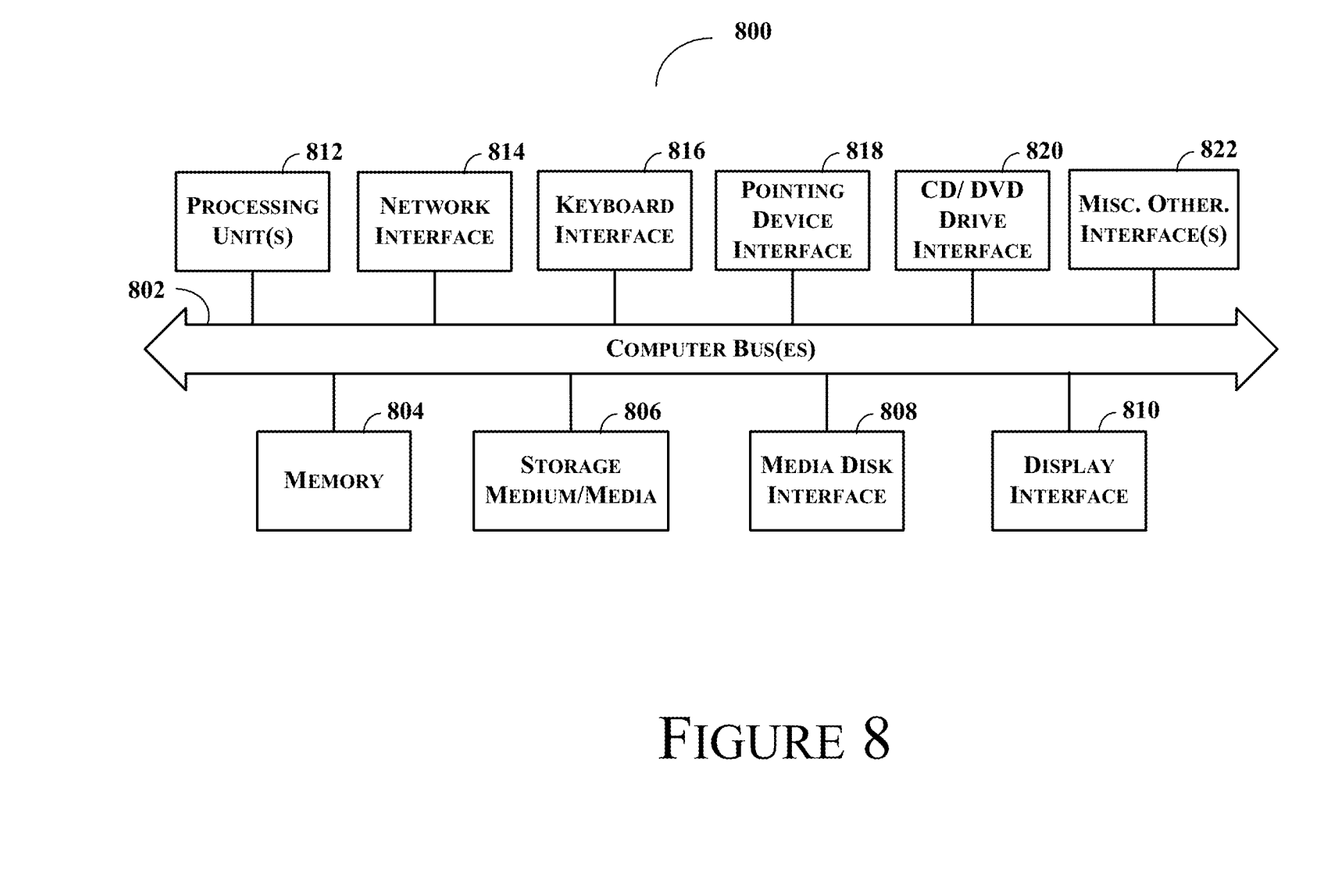
FIG. 8 provides an example of a block diagram illustrating an internal architecture of a computing device in accordance with one or more embodiments of the present disclosure.

FIG. 8 is a detailed block diagram illustrating an internal architecture of a computing device, e.g., a computing device such as server 702 or user computer 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   receiving, by at least one server, a query comprising a plurality of query terms;
   partitioning processing of the query into a plurality of posting list intersection tasks, each posting list intersection task to perform a partial intersection of a portion of each of at least two posting lists to identify a set of documents identified in the portion of each of the at least two posting lists processed by the posting list intersection task as containing the query terms associated with the at least two posting lists, each partial intersection comprising an intersection of the portion of each of the at least two posting lists, wherein the portion of a given one of the at least two posting lists is determinative of the portion of remaining ones of the at least two posting lists;
   performing, using a plurality of processing cores executing in parallel, the plurality of posting list intersection tasks, each posting list intersection task performing a partial intersection of the portion of each of the at least two posting lists processed by the posting list intersection task; and
   identifying, by the at least one server, a result set of documents from the set of documents identified by each of the posting list intersection tasks as a response to the received query.

2. The method of claim 1, wherein a posting list intersection task operates on two posting lists, the method further comprising:
   identifying the partial intersection of the two posting lists for a posting list intersection task using a skip interval defined by first and second skips of a smaller of the two posting lists and a skip interval defined by third and fourth skips of a larger of the two posting lists, the skip interval defined by the third and fourth skips being at least as large as the skip interval defined by the first and second skips.

3. The method of claim 2, identifying the partial intersection further comprising:
   identifying the first skip, in the smaller one of the two posting lists;
   identifying the second skip, $a_{i+1}$, the second skip being a next consecutive skip in the smaller one of the two posting lists;
   identifying the third skip, $b_j$, in the larger one of the two posting lists, where $b_j$ corresponds to a skip that occurs at or before skip $a_i$ in a skip order; and
   identifying the fourth skip, $b_k$, in the larger one of the two posting lists, where $b_k$ corresponds to a fourth skip that occurs at or after $a_{i+1}$ in the skip order.

4. The method of claim 1, the plurality of posting list intersection tasks identifying an intra-query parallelism.

5. The method of claim 1, further comprising:
   performing, using the plurality of processing cores executing in parallel, a scoring of documents identified in the posting list intersection tasks.

6. The method of claim 5, identifying a result set of documents further comprising:
   identifying the result set of documents using the document scoring.

7. The method of claim 5, wherein each posting list intersection task includes scoring the set of documents identified in the portion of each of the at least two posting lists corresponding to the posting list intersection task.

8. The method of claim 5, wherein a plurality of scoring tasks are used to score documents, each scoring task scores a document identified by a posting list intersection task.

9. A computer-readable non-transitory medium tangibly storing thereon computer-executable process steps, the process steps comprising:
   receiving a query comprising a plurality of query terms;
   partitioning processing of the query into a plurality of posting list intersection tasks, each posting list intersection task to perform a partial intersection of a portion of each of at least two posting lists to identify a set of documents identified in the portion of each of the at least two posting lists processed by the posting list intersection task as containing the query terms associated with the at least two posting lists, each partial intersection comprising an intersection of the portion of each of the at least two posting lists, wherein the portion of a given one of the at least two posting lists is determinative of the portion of remaining ones of the at least two posting lists;
   performing, using a plurality of processing cores executing in parallel, the plurality of posting list intersection tasks, each posting list intersection task performing a partial intersection of the portion of each of the at least two posting lists processed by the posting list intersection task; and
   identifying a result set of documents from the set of documents identified by each of the posting list intersection tasks as a response to the received query.

10. The medium of claim 9, wherein a posting list intersection task operates on two posting lists, the program steps further comprising:
    identifying the partial intersection of the two posting lists for a posting list intersection task using a skip interval defined by first and second skips of a smaller of the two posting lists and a skip interval defined by third and fourth skips of a larger of the two posting lists, the skip interval defined by the third and fourth skips being at least as large as the skip interval defined by the first and second skips.

11. The medium of claim 10, the program step of identifying the partial intersection further comprising:
    identifying the first skip, in the smaller one of the two posting lists;
    identifying the second skip, $a_{i+1}$, the second skip being the next consecutive skip in the smaller one of the two posting lists;
    identifying the third skip, $b_j$, in the larger one of the two posting lists, where $b_j$ corresponds to a skip that occurs at or before skip $a_i$ in a skip order; and
    identifying the fourth skip, $b_k$, in the larger one of the two posting lists, where $b_k$ corresponds to a fourth skip that occurs at or after $a_{i+1}$ in the skip order.

12. The medium of claim 9, the plurality of posting list intersection tasks identifying an intra-query parallelism.

13. The medium of claim 9, the process steps further comprising:
performing, using the plurality of processing cores executing in parallel, a scoring of documents identified in the posting list intersection tasks.

14. The medium of claim 13, the process step of identifying a result set of documents further comprising:
identifying the result set of documents using the document scoring.

15. The medium of claim 13, wherein each posting list intersection task includes scoring the set of documents identified in the portion of each of the at least two posting lists corresponding to the posting list intersection task.

16. The medium of claim 13, wherein a plurality of scoring tasks are used to score documents, each scoring task scores a document identified by a posting list intersection task.

17. A system comprising:
at least one server, the at least one server comprising a search engine that receives a query comprising a plurality of query terms;
a partitioner coupled to the search engine, the partitioner partitions processing of the query into a plurality of posting list intersection tasks, each posting list intersection task to perform a partial intersection of a portion of each of at least two posting lists to identify a set of documents identified in the portion of each of the at least two posting lists processed by the posting list intersection task as containing the query terms associated with the at least two posting lists, each partial intersection comprising an intersection of the portion of each of the at least two posting lists, wherein the portion of a given one of the at least two posting lists is determinative of the portion of remaining ones of the at least two posting lists;
a plurality of processing cores coupled to the partitioner, the plurality of processing cores execute in parallel to perform the plurality of posting list intersection tasks, each posting list intersection task performing a partial intersection of the portion of each of the at least two posting lists processed by the posting list intersection task; and
the at least one server comprising a result presenter that identifies a result set of documents from the set of documents identified by each of the posting list intersection tasks as a response to the received query.

18. The system of claim 17, wherein a posting list intersection task operates on two posting lists, the partitioner that partitions processing of the query into a plurality of posting list intersection tasks:
identifies the partial intersection of the two posting lists for a posting list intersection task using a skip interval defined by first and second skips of a smaller of the two posting lists and a skip interval defined by third and fourth skips of a larger of the two posting lists, the skip interval defined by the third and fourth skips being at least as large as the skip interval defined by the first and second skips.

19. The system of claim 18, the partitioner that partitions processing of the query into a plurality of posting list intersection tasks and identifies the partial intersection of the two posting lists for a posting list intersection task using a skip interval:
identifies the first skip, in the smaller one of the two posting lists;
identifies the second skip, $a_{i+1}$, the second skip being the next consecutive skip in the smaller one of the two posting lists;
identifies the third skip, $b_j$, in the larger one of the two posting lists, where $b_j$ corresponds to a skip that occurs at or before skip $a_i$ in a skip order; and
identifies the fourth skip, $b_k$, in the larger one of the two posting lists, where $b_k$ corresponds to a fourth skip that occurs at or after $a_{i+1}$ in the skip order.

20. The system of claim 17, the plurality of posting list intersection tasks identifying an intra-query parallelism.

21. The system of claim 17, the plurality of processing cores:
perform a scoring of documents identified in the posting list intersection tasks.

22. The system of claim 21, result presenter that identifies a result set of documents identifies the result set of documents using the document scoring.

23. The system of claim 21, wherein each posting list intersection task includes scoring the set of documents identified in the portion of each of the at least two posting lists corresponding to the posting list intersection task.

24. The system of claim 21, wherein a plurality of scoring tasks are used to score documents, each scoring task scores a document identified by a posting list intersection task.

25. The system of claim 17, wherein the at least one server comprises the plurality of processing cores.

26. The system of claim 25, wherein the plurality of processing cores execute program code to provide the partitioner.

27. The system of claim 25, wherein the at least one server further comprises the partitioner.

* * * * *